Nov. 7, 1961 V. W. BALZER 3,007,462
RECIPROCATING MACHINE
Filed Aug. 26, 1957 7 Sheets-Sheet 1
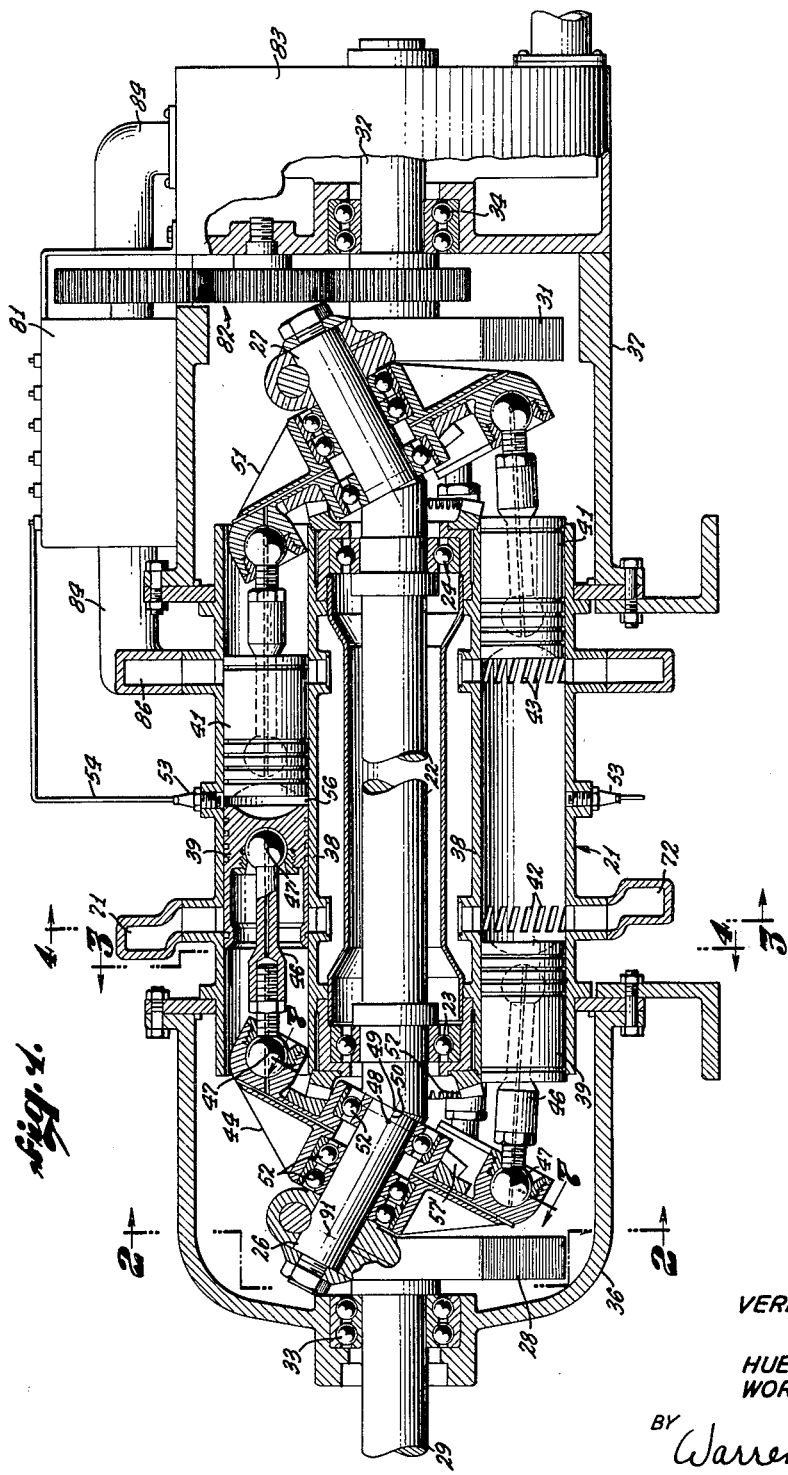
VERNON W. BALZER,
INVENTOR.
HUEBNER, BEEHLER,
WORREL & HERZIG,
ATTORNEYS.
BY Warren T. Jessup Nov. 7, 1961 V. W. BALZER 3,007,462
RECIPROCATING MACHINE
Filed Aug. 26, 1957 7 Sheets-Sheet 2
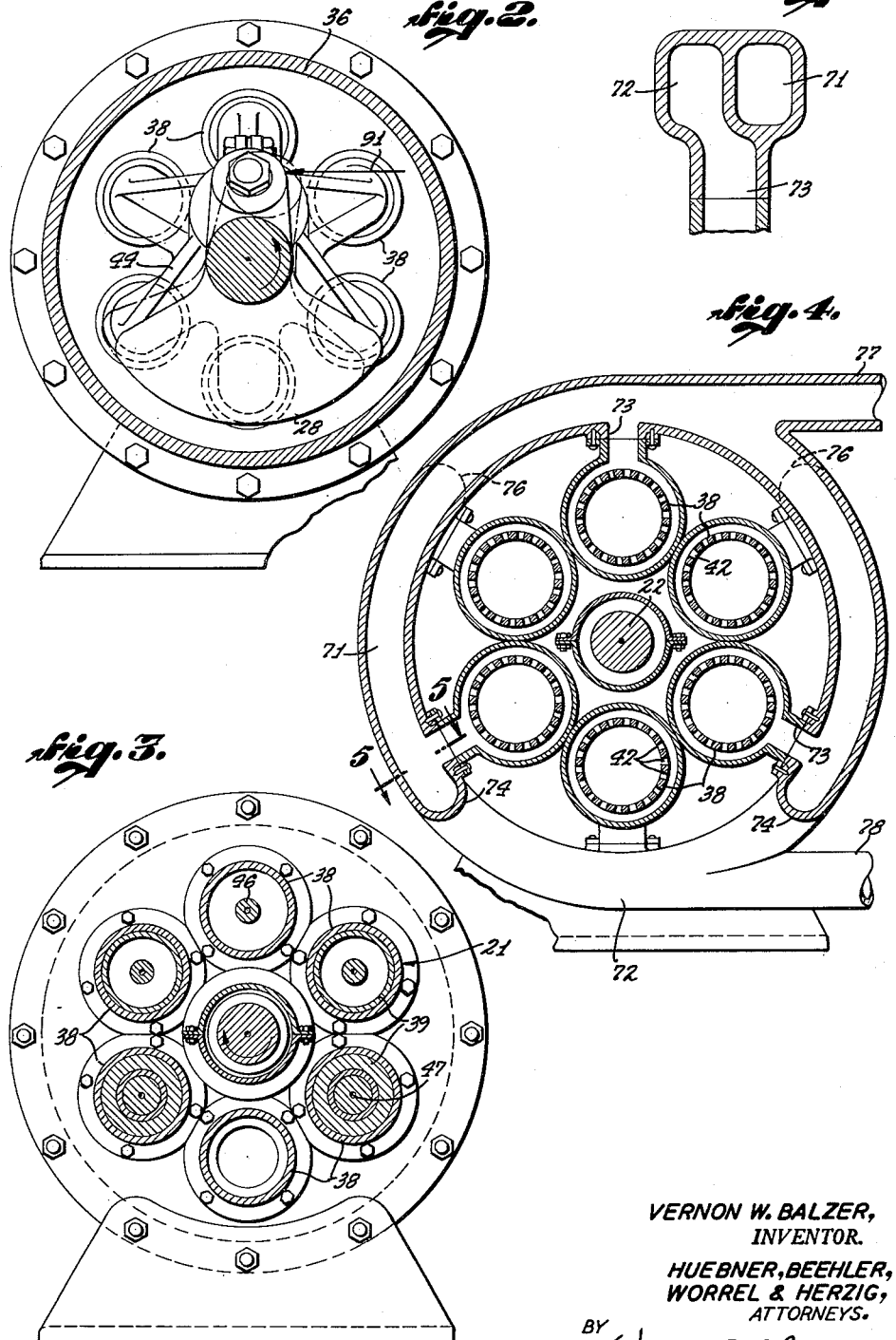
VERNON W. BALZER,
INVENTOR.
HUEBNER, BEEHLER,
WORREL & HERZIG,
ATTORNEYS.
BY Warren T. Jessup Nov. 7, 1961 — V. W. BALZER — 3,007,462
RECIPROCATING MACHINE
Filed Aug. 26, 1957 — 7 Sheets-Sheet 3
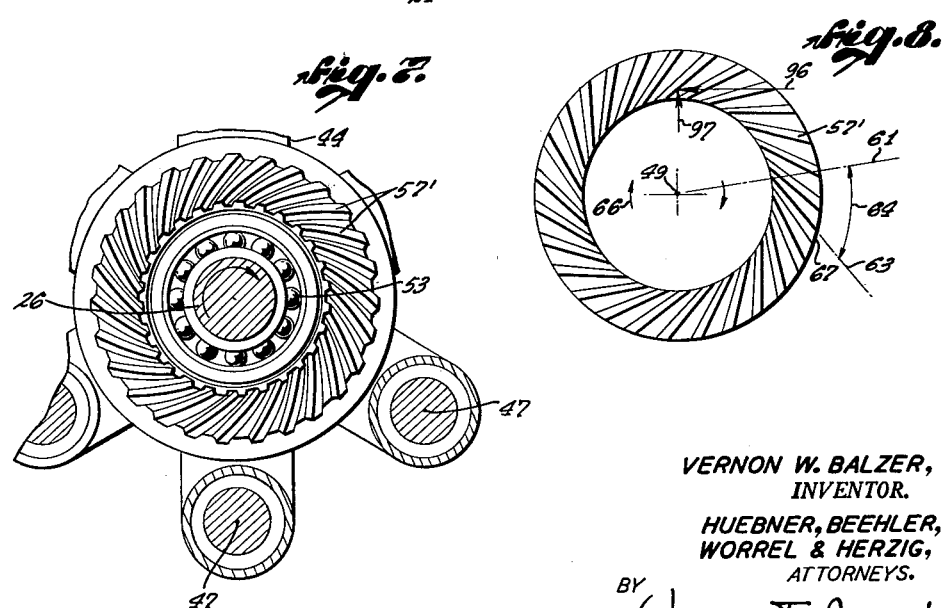
VERNON W. BALZER,
INVENTOR.
HUEBNER, BEEHLER,
WORREL & HERZIG,
ATTORNEYS.
BY Warren T. Jessup

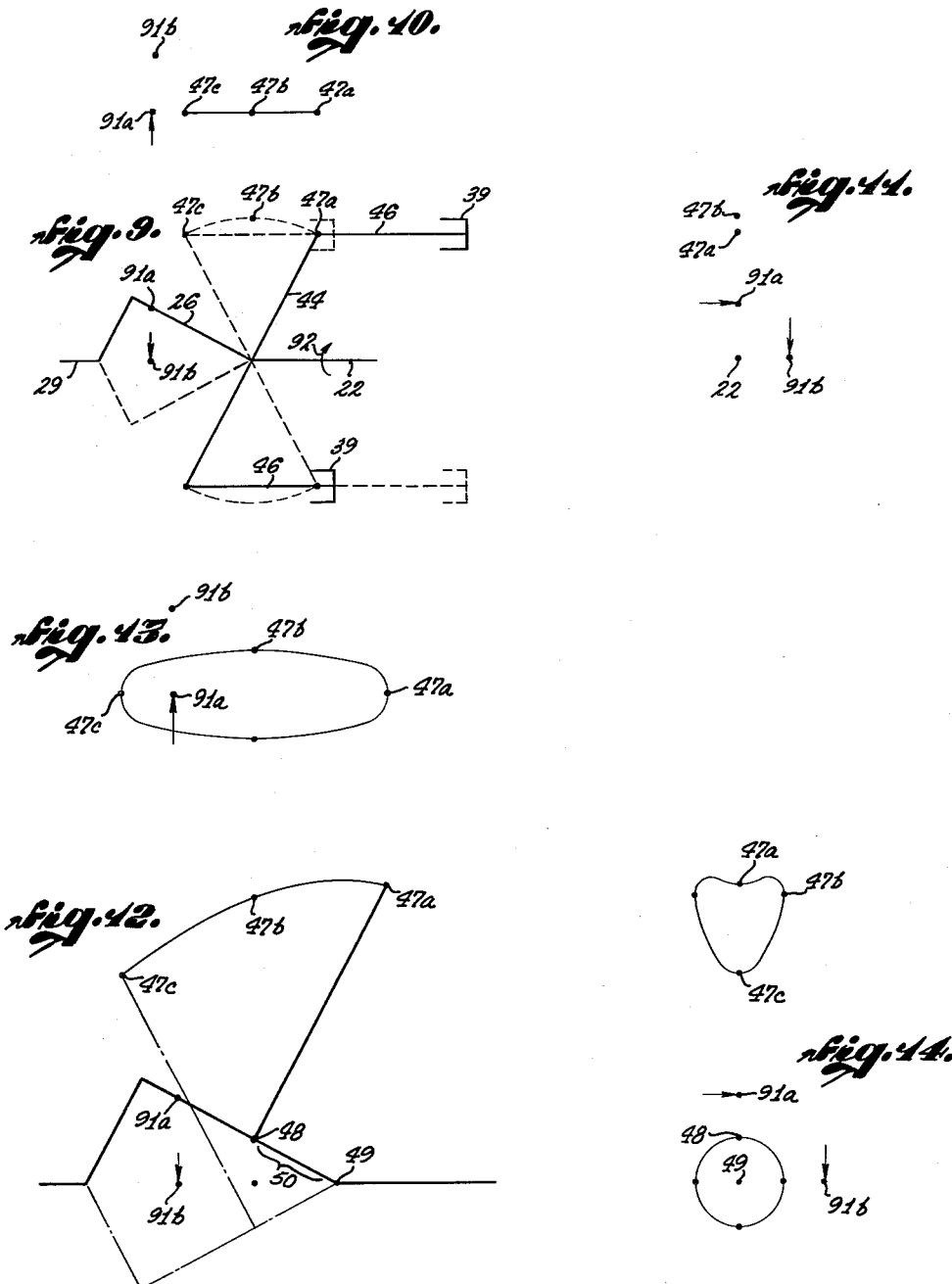

Nov. 7, 1961     V. W. BALZER     3,007,462
RECIPROCATING MACHINE
Filed Aug. 26, 1957     7 Sheets-Sheet 5
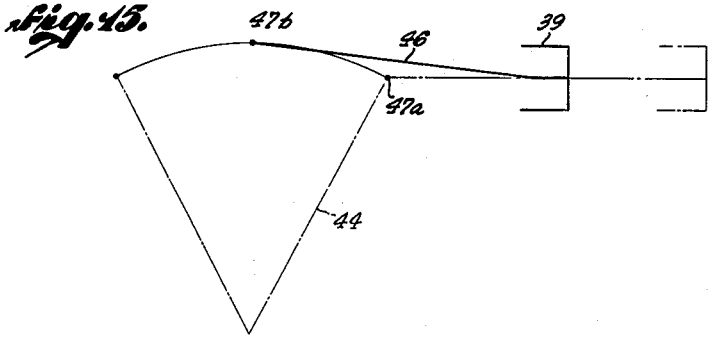
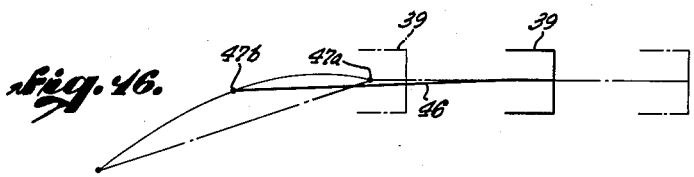
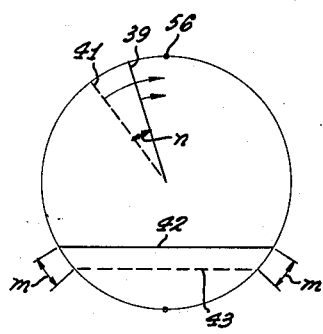 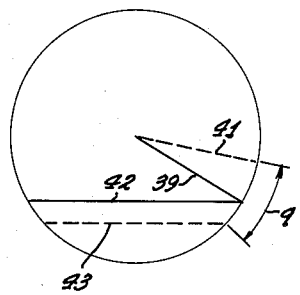 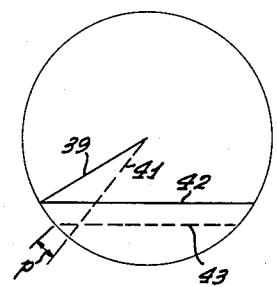
VERNON W. BALZER,
INVENTOR.
HUEBNER, BEEHLER,
WORREL & HERZIG,
ATTORNEYS.
BY Warren T. Jessup

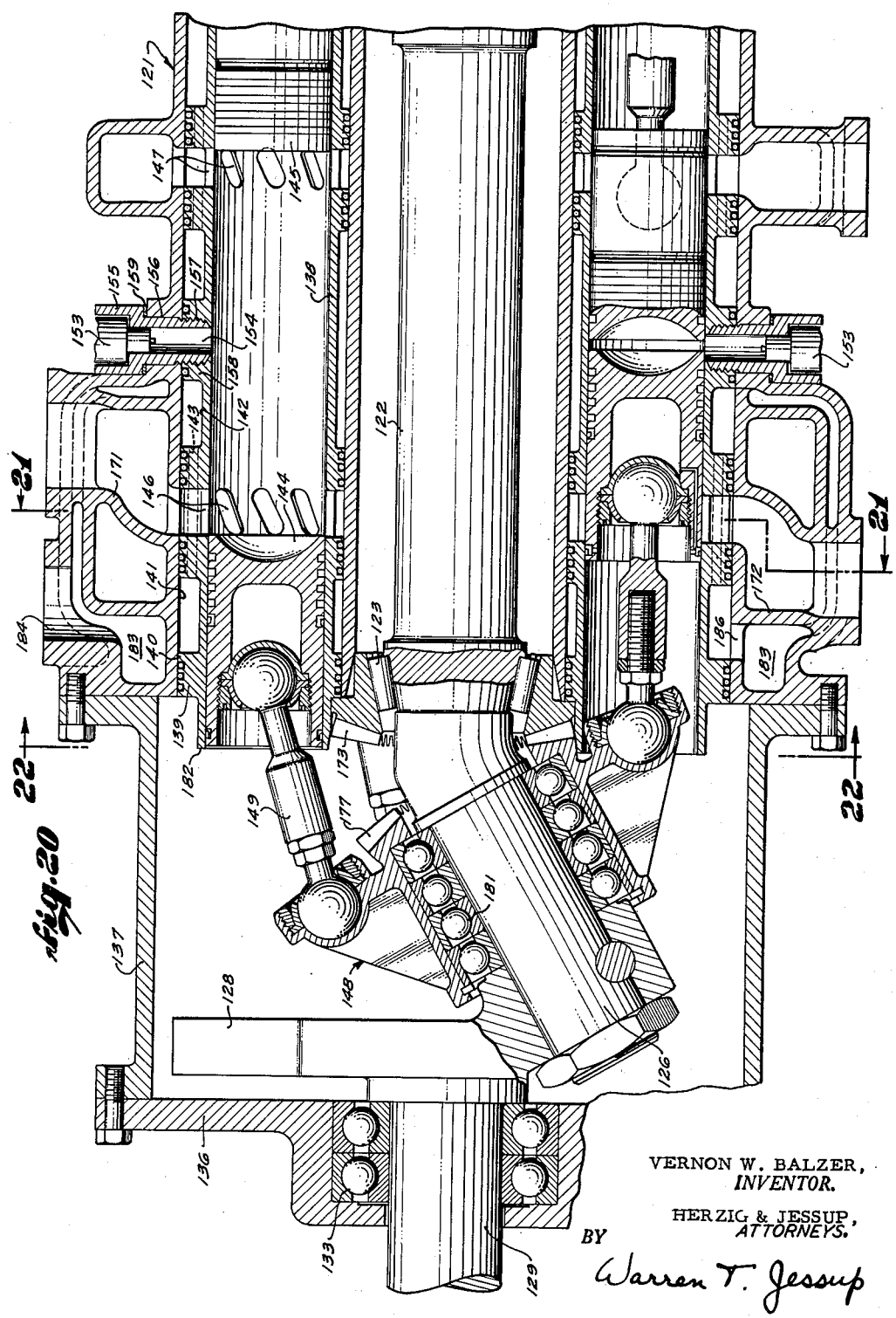

Nov. 7, 1961
V. W. BALZER
3,007,462
RECIPROCATING MACHINE
Filed Aug. 26, 1957
7 Sheets-Sheet 7
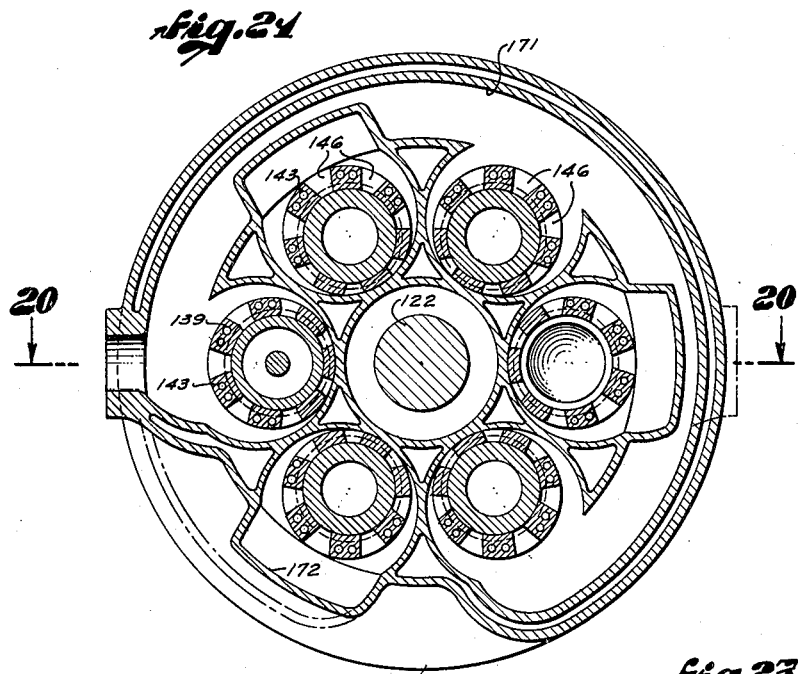
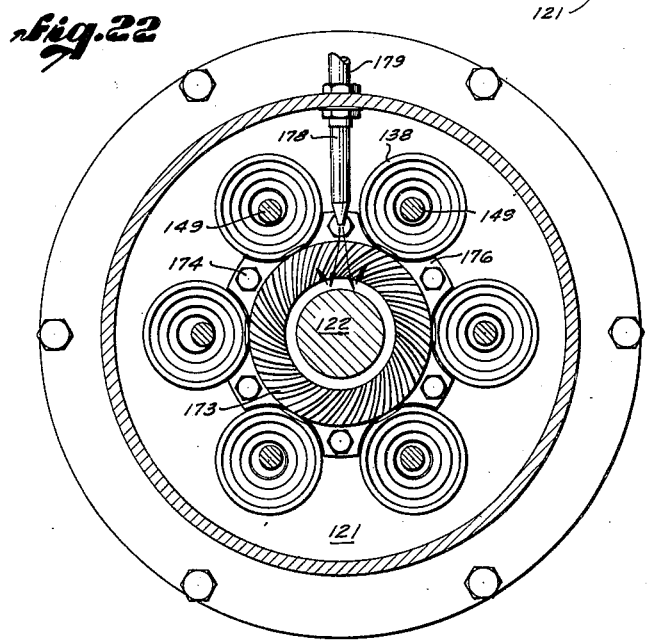
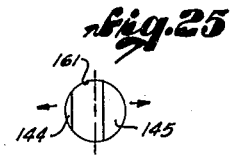
VERNON W. BALZER,
*INVENTOR.*
HERZIG & JESSUP,
*ATTORNEYS.*
BY Warren T. Jessup

United States Patent Office 3,007,462
Patented Nov. 7, 1961

3,007,462
RECIPROCATING MACHINE
Vernon W. Balzer, 2921 Via La Selva,
Palos Verdes, Calif.
Filed Aug. 26, 1957, Ser. No. 680,117
8 Claims. (Cl. 123—58)

This invention relates to reciprocating machines, and is more particularly related, but not necessarily limited in all its features, to a barrel type reciprocating machine having a central shaft and a number of parallel cylinders spaced around the shaft.

This application is a continuation-in-part of my copending application, Serial No. 435,197, filed June 8, 1954, now abandoned.

Barrel type machines of the type here under consideration consist essentially of a block with a shaft journaled therein, said shaft having an oblique crank on each end thereof. Journaled on each crank is a wabble spider, to which are linked a plurality of pistons that reciprocate in opposed fashion within cylinder spaced circumferentially about the shaft of the machine. Such machines may be used either as compressors, in which case the shaft is driven; or as power generating machines, in which case a fluid under pressure is injected or formed within the cylinder between the two opposed pistons.

In a customary case, this expanding fluid takes the form of gasoline which is exploded in customary fashion, to make of the machine an internal combustion engine. When thus used as an engine, the compressive thrust imparted to the rods linking the piston and wabble spider, must be translated into a torque on the shaft, by means of the configuration and attitude of the wabble spider and its journaling on the oblique shaft cranks. In this translation, the original line of thrust is widely departed from a circumferential or tangential line of thrust, which would be the most efficient or optimum angle of approach for rotating the shaft. Therefore, there are of necessity introduced rather high friction losses as the thrust of the pistons is translated into a torque on the shaft.

It is an object of this invention to provide an improved engine of the type here under consideration in which friction losses are minimized by orienting the piston rods more closely to a tangential thrust line with respect to the engine shaft, such a tangential thrust line representing the vector of optimum force application to the crank.

Another shortcoming of machines of this type is that the simultaneous outward thrust on the opposed pistons produces a tensioning which must be resisted by some part of the machinery. It is another object of the present invention to cause the outward thrust of the opposed pistons to be transmitted by a direct path to the engine shaft, so that this opposed thrust is resisted by a direct tensioning of the shaft itself. This shaft may be made very strong in tension, and hence readily made able to withstand this outward thrust of the opposed pistons.

It is a further object of this invention, to provide in an opposed piston reciprocating machine, improved structure and configuration of the parts whereby optimum opening and closing of the inlet and outlet valves by which fluid is admitted to and evacuated from the cylinders may be effected.

In a barrel type engine, as here disclosed, means are generally provided for preventing the wabble spider from rotating while still permitting it to wobble in response to rotation of the shaft crank. In translating the thrust of the pistons into a torque on the shaft, there is a tendency, by virtue of the geometry of the apparatus, to place a considerable radial or side thrust on the shaft bearings. This requires that the bearings must be designed more sturdy than would be the case if the radial thrust were not present. It is an object of this invention to lessen the radial thrust on the shaft bearing by appropriate design of the wabble spider gearing, which also serves to prevent the spider from rotating.

It is desirable, particularly when employing a reciprocating machine of the type here under consideration as as internal combustion engine, to avoid intermingling of exhaust gases between adjacent cylinders in the engine cycle. It is a further object of this invention to provide a means for preventing or minimizing such intermingling of exhaust gases.

Yet another object of this invention is to provide a new and improved piston reciprocating machine which includes a pre-combustion chamber radially extending from and communicating with the combustion chamber of the machine which serves to locate the nozzle of the fuel injector away from the combustion chamber thereby increasing vaporization of the fuel, and to provide a chamber for the pre-cracking and pre-ignition of the fuel outside of the main combustion chamber.

In accordance with these and other objects which will become apparent hereinafter, a preferred form of the present invention is disclosed in the accompanying drawings wherein:

FIG. 1 is a sectional elevation of a reciprocating machine constructed in accordance with the present invention;

FIGS. 2, 3 and 4 are cross sections taken on the respectively numbered lines in FIG. 1;

FIG. 5 is a fragmentary section taken on line 5—5 in FIG. 4;

FIG. 6 is a fragmentary sectional view taken generally in the same plane as FIG. 1 and illustrating a feature of the present invention;

FIG. 7 is a fragmentary view taken on line 7—7 in FIG. 6;

FIG. 8 is an idealized schematic view useful in explaining certain features of the present invention;

FIGS. 9, 10 and 11 are schematic views representing operation of an engine of this general type and useful in explaining certain features of the present invention;

FIGS. 12, 13 and 14 are schematic views illustrating a certain feature of the present invention;

FIG. 15 is a schematic view illustrating certain features of the engines of this general type;

FIG. 16 is a schematic view illustrating certain operational features of the present invention;

FIGS. 17, 18 and 19 are diagrammatic schematic views illustrating operation of certain valve features of the present invention;

FIG. 20 is an enlarged fragmentary vertical sectional view of another embodiment in accordance with this invention;

FIG. 21 is a vertical sectional view as taken on a line 21—21 of FIG. 20;

FIG. 22 is a vertical sectional view as taken substantially along the line 22—22 of FIG. 20;

FIG. 23 is a schematic diagram showing the relationship between a pair of pistons and its corresponding pre-combustion chamber;

FIG. 24 is a view similar to FIG. 23, showing the pistons thereof in a changed position; and FIG. 25 is a view similar to FIGS. 23 and 24, showing the pistons thereof in another position.

Referring to the drawings, and particularly to FIG. 1, the machine is shown comprised of a block designated generally by the numeral 21. Through the center of the block 21 extends a shaft 22 which is journaled therein by means of bearings 23 and 24. The shaft 22 includes a pair of oblique cranks 26 and 27, preferably formed integral with the shaft 22. Fixed to the crank 26 is a counterweight member 28 which forms a return portion of the crank and serves to link the crank 26 to the shaft extension 29 preferably formed integral with the counterweight 28 and forming an aligned extension of the shaft 22. The opposite crank 27 has a similar counterweight 31 secured thereto, extending from which is an integrally formed stub shaft 32 forming an aligned extension of the shaft 22 at the other end of the machine. The extended portions 29 and 32 of the shaft are journaled in the machine by means of bearings 33 and 34 respectively, the bearing 33 being secured in an end bell 36 secured to one end of the block 21, and the bearing 34 being secured in an end bell 37 secured to the other end of the block 21.

The engine block 21 is comprised principally of a plurality of cylinders 38 disposed parallel to the shaft 22 and spaced equidistantly and equiangularly therearound. For reason which will become apparent hereinafter, the end of the block 21 to which the end bell 36 is secured will be denominated the exhaust half or end of the block, and the end to which the end bell 37 is secured will be denominated the inlet half or end of the block. Reciprocating in the exhaust half or ends of the cylinders 38 are exhaust pistons 39, and reciprocating in the inlet half or ends of the cylinders 38 are inlet pistons 41. The exhaust piston 39 is so called because it serves as a valve which opens and closes exhaust ports 42 communicating with the cylinder 38 at the exhaust end or half thereof; and the inlet piston 41 is so called because it opens and closes inlet ports 43 communicating with the cylinder 38 at the inlet half or end thereof.

A wabble spider 44 is journaled on the oblique crank 26. Linking the spider 44 to the several exhaust pistons 39 are piston rods 46, which are connected to the spider 44 by ball and socket joints centered at 47 and to the respective pistons by ball and socket joints centered at 47'. The centers 47 of the corresponding ball and socket joints are the effective points of intersection between the rods 46 and the spider 44. These points 47 are situated in a plane which is normal to the axis of the crank 26. This plane in FIG. 1 happens to coincide with the section line 7—7 which will be used in further reference to the plane. Numeral 48 indicates the point at which the axis of the crank 26 intersects the plane 7—7 in which are located the above mentioned intersection points 47. Numeral 49 indicates the point of intersection between the axis of the crank 26 and the axis of the shaft 22 proper. It will be seen that the plane 7—7 does not pass through the point of intersection 49 between the axis of the shaft 22 and the axis of the crank 26, but instead is displaced along the crank 26 by a distance 50 represented by the distance from the point 49 to the point 48. This displacement of the plane 7—7 is an important feature of the present invention, inasmuch as it causes each piston rod 46 to be oriented more closely to the vector of optimum force application on the crank 26 during the operation of the engine, as will be explained more fully hereinafter.

The crank 27 at the inlet end of the block 21 is similarly equipped with a wabble spider 51 which is linked in a similar manner to the exhaust pistons 41. With certain specific exceptions noted hereinbefore and to be noted hereinafter, the two ends of the engine are essentially the same.

The spider 44 is journaled on the crank 26 by a series of spaced ball bearings 52, which are constructed so as to accommodate the appreciable outward thrust on the spider 44 exerted by the pistons 39. This is effected partially by providing two of the bearings with inwardly extending shoulders 53 (FIG. 6) which aid in applying the outward thrust of the pistons 39 to the respective balls and thence to the crank 26, thus tensioning the shaft 22.

The engine shown in FIG. 1 is of the opposed piston type in which the two pistons 39 and 41 approach each other within the cylinder 38, generally in phase, and then are pushed apart, also generally in phase, by the rapid burning and expansion of the fuel injected at the injector 53 from the fuel line 54. The exact phase relation between the pistons 39 and 41 is determined by the phase relation between the two cranks 26 and 27 on the shaft 22. If the shaft 22 is formed with the two cranks in phase, then the pistons 39 and 41 will approach top dead center and recede from the top dead center in phase.

It is preferred, in accordance with the present invention, to angularly offset the cranks 26 and 27 slightly from each other so that the exhaust piston 39 leads the inlet piston 41 by a small fixed angle. The point designated by the numeral 56 will be defined as the operating center of the cylinder 38. Top dead center for either piston is represented by the position of the head of the piston when it is closest to the operating center 56. The operating center 56 is midway between the top dead center points of the two pistons 39 and 41. Because of the slight phase difference between the cranks 26 and 27, the pistons 39 and 41 do not reach their respective top dead centers simultaneously, but instead the piston 39 reaches its top dead center a few shaft degrees ahead of the piston 41. This phase advance of the exhaust crank 26 ahead of the inlet crank 27 may vary from about 8 degrees to 12 degrees of shaft rotation depending upon the operating characteristics desired, and is preferably around 10 degrees.

The effect of this phase advance of the exhaust piston 39 ahead of the inlet piston 41 is to cause the exhaust ports 42 to be opened and closed sooner (with reference to the inlet ports 43) than they would be without such phase displacement of the cranks. The opening and closing of the ports 42 and 43 is also dependent upon the placement of these ports with respect to the operating center 56 of the cylinder 38. In accordance with the present invention, the exhaust ports 42 are disposed closer to the operating center 56 than are the inlet ports 43. This difference in placement of the exhaust and inlet ports may be also measured in terms of crank rotation angle, and is equal to the angle of shaft rotation required to cause the pistons 39 and 41 to move through the given distance under consideration. In accordance with the present invention, the exhaust ports 43 are closer to the operating center 56 and hence to the top dead center points of their respective pistons, by a predetermined angle of crank rotation which is less than the angle of phase advance of the crank 26 ahead of the crank 27 (discussed hereinbefore). This angle of difference between the placement of ports 42 and 43 lies preferably between 3 degrees and 7 degrees depending upon the operating characteristics desired, and is more preferably about 5 degrees.

The net effect of the phase displacement between the cranks 26 and 27 and the differential placement of the ports 42 and 43 is to cause the exhaust ports 42 to be opened ahead of the inlet ports 43 by a shaft rotation angle equal to the sum of the two angles discussed hereinbefore, and to cause the exhaust ports 42 to be closed ahead of the inlet ports 43 by a shaft rotation angle equal to the difference between these two angles. Thus, if the shaft 22 is formed with the exhaust crank 26 leading the inlet crank 27 by 15 degrees and the exhaust ports 42 are located closer to the operating center 56 than are the inlet ports 42 by an angle of 5 degrees of crank rotation; then the net effect will be to cause the exhaust ports 42 to be opened 15 degrees ahead of the inlet ports 43 and to be closed 5 degrees ahead of the inlet ports. The detailed operation and advantages of this feature will be discussed more fully hereinafter in conjunction with FIGS. 17, 18 and 19.

In the operation of the machine, as the piston 39 reciprocates in the cylinder 38, a thrust is successively applied to the various points 47 on the wabble spider 44, causing it to wabble and thus impart rotation to the crank 26 and to the shaft 22. This rotation is taken from the shaft 29 as useful power. The spider 44 does not rotate in operation of the machine; it merely wabbles around as the crank 26 rotates. However, transmission of torque from the outward thrust of the piston rods 46 to the crank 26 produces a torque on the spider 44 which tends to cause it to rotate. If this torque were not resisted in some fashion, the piston rods 46 would be driven over to the side walls of the cylinders 38 jamming the machine.

In order to prevent rotation of the spider 44 while still permitting the necessary wabbling, the spider 44 is linked to the block 21 by beveled gearing represented by the beveled gear teeth 57 on the block 21 circumjacent the shaft 22, meshing with the beveled gear teeth 57' on the interior face of the spider 44. The angle of bevel of these teeth is dictated by the obliquity of the crank 26 with respect to the shaft 22.

Such beveled gearing 56 and 57' would fulfill its primary purpose merely by being formed with radial teeth, that is, with teeth lying on lines passing through the axis of the gearing. However, in accordance with the present invention, it is desired to improve the design of this gearing and impart additional desirable functional qualities to the operation thereof by disposing the gear teeth obliquely with respect to such radial line through the gearing axis.

Referring to FIG. 7, it will be noted that the gear teeth 57' on the spider 44 are slanted with respect to such a radial line. The nature of this slanting is more apparent in the schematic view shown in FIG. 8, which is a view similar to FIG. 7 except that a slight curvature in the teeth has been eliminated for simplicity of explanation. Referring to FIG. 8, 61 designates a generally radial line emanating from the point 49 on the gearing axis. It will be noted that the gear teeth 57' do not lie along such radial line 61, but instead are disposed obliquely with respect to the line 61, so as to lie along a line 63 displaced by an angle 64 from the radial line 61. The angle 64 may vary anywhere from zero to 50 degrees and is preferably in the neighborhood of 35 degrees.

Let it be assumed that the machine is designed so that the crank 26 rotates clockwise, viewed in FIG. 7, as indicated by the direction line 66. It will be noted in FIG. 8 that the outer end 67 of each tooth 57 leads the inner end 67 of the tooth, with reference to the direction of rotation of the crank 26, as indicated by the line 66.

The bevel gearing 57 on the block 21 is of course similarly slanted in order to mate properly with the teeth 57' shown in FIG. 8. In practice, it is preferred to impart a slight curvature to the teeth 57', as shown in FIG. 7, in addition to the angular offset 64 discussed hereinbefore.

The angular offset 64 of the gearing 56—57' causes the block gearing 57 to absorb an appreciable portion of the radial thrust on the spider 44, which would otherwise have to be absorbed by the shaft bearing 23, as will be explained hereinafter.

It will of course be understood that the structure at the inlet end of the block 21 is similar to that described hereinbefore in connection with the exhaust end.

When the machine of the present invention is employed as a 2-cycle combustion engine, as specifically shown in the drawing, there arises the difficulty that the exhaust gases from a given cylinder 38 tend to impede the discharge of exhaust gases from a cylinder which is cyclically adjacent thereto. In order to minimize this objection, and in accordance with the present invention, there are provided a pair of arcuate exhaust manifolds, 71 and 72, shown in FIGS. 1, 4 and 5. The upper manifold 71 communicates with every other cylinder in the operating cycle of the machine through the manifold ports 73. The lower exhaust manifold 72 communicates with the remaining three cylinders 38 by means of manifold ports now shown in the drawings. As shown in FIGS. 1 and 5 the manifolds 71 and 72 are disposed longitudinally of the engine block so as to have ready access to every other cylinder as required. Since the manifold 71 does not communicate with the bottom cylinder 38, it is not necessary for the manifold 71 to completely encircle the block. The manifold 71 is therefore made arcuate and terminates at 74 as shown in FIG. 4. Similarly, the manifold 72 is arcuate and terminates in end walls 76. The manifold 71 communicates with an exhaust pipe 77 and the manifold 72 communicates with an exhaust pipe 78.

In accordance with the present invention, when the machine herein disclosed is used as a deisel engine, it is preferred to provide the engine with a starting motor 81 which serves the double function of starting the engine and of operating a blower. The starting motor 81 is coupled to the shaft 32 through gearing 82. The shaft 32 in turn drives a blower 83 which may be either of the positive displacement type or the centrifugal type. The output of the blower is led by a conduit 84 to an inlet manifold 86 which communicates with the inlet ports 43 of each of the cylinders 38. By causing the blower 83 to be driven by the starting motor 81, positive scavenging is assured during the starting of the engine.

*Operation*

The operation of the machine illustrated herein is substantially as follows.

Referring to FIG. 1 and to the uppermost pair of pistons 39 and 41 shown therein, at the instant shown, the air between the two pistons is at its highest compression. At the proper operating point, diesel fuel is injected through the injector 53 into the cylinder 38, and rapid burning takes place as is well known. The resulting rapid expansion of the air forces the pistons 39 and 41 apart. This separating force is applied simultaneously to the spiders, 44 and 51 through the connecting rods 46. Through the spiders, this force is applied as a rotative force to the cranks 26 and 27, causing the shaft 22 to rotate clockwise as viewed in FIG. 3.

The advantages resulting from the offset 50 of the plane 7—7 from the point 49 to the point 48, during this translation of the driving force from the piston rods 46 through the spider 44 to the crank 26 will now be described.

Referring to FIG. 1, it will be evident that the useful force which causes the crank 26 to rotate is represented by a vector passing perpendicularly into the plane of the drawing at the point 91. This is illustrated schematically by the arrowed line 91 in FIG. 2. Such a vector may thus be considered as the vector of optimum force application on the crank 26.

If the plane 7—7 of the intersecting points 47 between rods 46 and spider 44 were not offset from the intersection point 49, then the operation of the engine would be substantially as illustrated in the schematic diagrams FIGS. 9–11. As shown in these figures, as the piston 39 reciprocates, the spider 44 wabbles back and forth, causing the intersecting point 47 to move back and forth. When viewed in a plane passing through the piston 39 and shaft 22, as shown in FIG. 9, this point follows an arcuate path lying in the plane of the drawing, through the points 47a, 47b and 47c. The path of movement of the point 47 is in a plane. Thus a view looking down on FIG. 9 (which if FIG. 10) appears substantially as a straight line. Similarly, a view looking at the end of the rod 46 appears as a straight line moving up and down, as shown in FIG. 11.

At the moment when the piston 39 starts to recede from its top dead center position, which is the position shown in FIG. 9, the force applied to the spider 44 from the rod 46 has no component whatever which lies in the direction of the optimum force vector 91. Thus at this particular moment no torque is being derived from the stroke of the piston 39. However, moments later, when the crank 26 has rotated slightly in a clockwise direction, as shown arrow 92, the force of the piston 46 begins to apply a useful torque to the crank 26. When the connecting point 47 is at position 47b, the angle of application of this force is most favorable or most neary aligned with the vector of optimum force application 91. Even at this point, however, the angle is rather unfavorable and much of the force is wasted in the bearings. Thus it will be seen in FIGS. 9, 10 and 11 that the line between the point 47b and the point 91b is quite divergent from the optimum force vector 91b. The same is true in increasing degree during the transition from the position 47a to the position 47b.

Referring now to FIGS. 12, 13 and 14, the advantage of offset 50 will be apparent. The offset in FIG. 12 has been exaggerated for purposes of illustration. Referring to these figures, it will be seen that with the offset 50, the intersecting point 47 no longer oscillates in the plane of the drawing but instead follows a loop-shaped path. When the shaft 22 is in the "b" position, it is seen that the angle of force application between the connecting point 47b and the point 91b on the shaft, is now much more favorable with respect to the optimum force vector 91b, than was the case in FIGS. 9, 10 and 11. This is particularly evident in FIGS. 13 and 14. While in the actual structure the offset is appreciably smaller than illustrated in FIG. 12, nonetheless, the advantages are very marked and are particularly effective during the early portion of the stroke from position 47a to position 47b, when the compression and hence the force are greatest.

The offset 50 also has the advantage of minimizing the angular displacement of the piston rod 46 with respect to the cylinder 38 during the high pressure portion of the stroke, 47a to 47b. This is best seen in FIGS. 15 and 16. FIG. 15 is similar to FIG. 9 on a somewhat larger scale, and shows that during the high pressure portion of the stroke, the piston rod 46 swings from the position shown at 47a to that shown at 47b, where the angularity between the rod and the cylinder is a maximum. In contrast, FIG. 16, which is similar to FIG. 12, illustrates that with the offset feature, the rod 46 in moving from position 47a to 47b (or from 47b to 47a) stays very closely aligned with the cylinder and hence there is less side friction on the pistons during this critical portion of the stroke.

The functional advantage of slanting the gearing on the wabble spider 44 in the manner shown in FIG. 8 will now be explained. In the translation of the driving force from the connecting point 47 to the crank 26, through the wabble spider 44 (FIG. 6), there is of necessity an appreciable radial force applied to the spider 44. With the spider in the attitude or position shown in FIG. 6, this force would generally be downward on the spider, and would appear as a radial force 94 on the main shaft bearing 23.

With the shaft 22 being rotated clockwise (FIG. 8) by the action of the piston 39, there is applied to the spider 44, through the meshed teeth of the gears 57 and 57', a counterclockwise torque, which represents itself as a force 96 applied to a meshed tooth 57 on the spider 44. By virtue of the slant or departure of the teeth 57' away from an outward or radial line, the force 96 may be resolved to include a component 97 which is radially outward. Thus the slanting of the teeth shown in FIG. 8 produces a radially outward force 97, on the meshing tooth 57' of the spider 44. This force 97 counteracts some of the radial force which would otherwise appear at 94 and have to be absorbed by the bearing 23. Thus it is seen that the obliquity of the teeth 57—57' permits a large portion of the radial force to be absorbed by the block 21 through the gearing 57 rather than through the bearings 23 with resulting saving on the bearing structure.

Another feature of the present invention lies in the fact that the design is such as to cause the opposing outward forces produced by the burning of the fuel within the cylinder 38, to be applied as a tension force directly to the shaft 21, without placing any appreciable stress on the casing or block 21. As is well known, most metals generally have their maximum strength in tension, and therefore maximum effectiveness is made of the structural parts by placing the shaft 22 under tension.

As reference to FIG. 1 will show, this absorption or counter action of the outward or separating forces applied to the pistons 39 and 41 is effected by transmitting such forces through the spiders 44 and 51, respectively, to the respective thrust bearings 52, which serve to transmit the opposed outward forces to the cranks 27 and 28, thus placing the shaft 22 under tension. It will be noted that the transmission of the outward forces is done without placing any stress on the block 21 or other portions of the housing.

As the pistons 39 and 41 separate, or move outward, the upper edge of the piston 39 first clears the exhaust ports 42 and permits the burned gases to be evacuated from the cylinders 38. The piston 39 clears the exhaust ports 42 before the piston 41 clears the inlet ports 43. This advance opening of the exhaust ports is brought about by the combination of the advance in the exhaust crank 26 ahead of the inlet crank 27, plus the further fact that the exhaust ports 42 are closer to the operating center 56 of the cylinders 38 than are ports 43.

This is illustrated schematically in FIGS. 17, 18 and 19. Referring to FIG. 17, let it be assumed that the exhaust crank 26 is advanced 10 degrees ahead of the inlet crank 27. This 10 degree advance is represented by the angle "n" in FIG. 17. Let it be assumed further that the exhaust ports 42 are located closer to the operating center 56 than are the inlet ports 43, by a distance equivalent to a crank angle represented by "m," in this example, 5 degrees. Referring now to FIG. 16, it will be seen that the exhaust ports 42 open ahead of the inlet ports 43 by a crank angle "q," equal to the sum of "n" plus "m," i.e., 15 degrees. Referring to FIG. 19, it will be seen that after the pistons 39 and 41 have reached bottom dead center and have started their compression stroke, the exhaust ports 42 close ahead of the inlet ports 43 by an angle "p," equal to "n" minus "m," or 5 degrees.

The advantages of this structure are as follows: It is desirable that, on the expansion stroke, the exhaust ports should be opened well ahead of the inlet ports in order to insure full advance scavenging so that when the inlet ports are opened to admit compressed air from the compressor 83, a shorter time is required to evacuate all of the previous burned gases and mixing of gases is minimized. Such a long advance however, is not desirable on the compression stroke where only a slight advance in closing of the exhaust port is desired in order to give a slight supercharging to the cylinder. It will be readily seen that the present combination of the controllable advance between the exhaust and inlet cranks and the controllable advance between the ports 42 and 43 permits any combination of advance opening and advance closing desired. This design feature is important in that it permits a wide flexibility in designing the engine to fit any desired situation.

As mentioned hereinbefore the advance of the exhaust crank, causes the exhaust piston to reach top dead center ahead of the inlet piston. Thus there is no danger of the pistons locking on top dead center, since one will be off dead center when the other is on. In the case of an internal combustion engine this also has the advantage of spreading the combustion shock on the crank shaft over an arc equal to the angular separation ($n$) between the cranks.

As mentioned hereinbefore, during exhausting of the cylinders 38, the use of the dual exhaust manifolds 71 and 72 and their staggered connection to the cylinders 38 minimizes deleterious interference of one cylinder with the cyclically adjacent cylinder during the exhaust portion of the stroke.

Referring to FIGS. 20–25, there is illustrated another embodiment of this invention. Referring particularly to FIG. 20, a machine is shown comprised of a block designated generally by the numeral 121. Through the center of the block 121 extends a shaft 122 which is journaled therein by means of opposed bearings, one of which is shown at 123. The shaft 122 includes a pair of oblique cranks, one of which is shown at 126, preferably formed integral with the shaft 122. Fixed to the crank 126 is a counterweight member 128 which forms a return portion of the crank and serves to link the crank 126 to a shaft extension 129 preferably formed integral with the counter 128 and forming an aligned extension of the shaft 122. The opposite crank (not shown) has a cylinder counterweight secured thereto, extending from which is an integrally formed stub shaft physically and functionaly similar to the shaft 32 of the previously described embodiment, forming an aligned extension of the shaft 122 at the other end of the machine. The extended portions of the shaft are journaled in the machine by means of bearings as shown at 133, the bearing 133 being secured in an end wall 136 of a housing 137 secured to one end of the block 121, and being similarly supported at the other end of the block 121.

The engine block 121 is comprised principally of a body having cylinders 138 disposed parallel to the shaft 22 and spaced equidistantly and equiangularly therearound, similar to the cylinders 38 of the block 21. In the instant embodiment, however, the cylinders 138 are in the form of cylindrical sleeves having outwardly extending annular flanges 139. As best seen in FIG. 21, the flanges 139 have a circumferential surface 140 eccentric relative to the cylinders 138, the surfaces 140 having a close fit within a plurality of bores 141 extending longitudinally through the block 121.

The bores 141 and cylinders 138 are preferably arranged in such manner that the space between the outer surface 142 of the cylinder 138 and the outer surface of the bore 41 is greater than the space between the said surface 142 and the inner surface of the bore 141, for a purpose which will be hereinafter described.

The annular space provided by the cylinder 138 and the bore 149 serves as a jacket through which a coolant agent, such as water or the like, may be caused to flow to cool the cylinder 138 during operation of the engine. In order to circulate the cooling solution between the annular spaces formed by the flanges 139, a plurality of transverse passages 143 are provided in the flanges 139.

Reciprocating in the exhaust half or ends of the cylinders 138 are exhaust pistons 144, and reciprocating in the inlet half or ends of the cylinders 138 are inlet pistons 145. Similarly to the pistons 39 and 41, respectively, of the previous embodiment, the exhaust piston 144 serves as a valve which opens and closes exhaust ports 146 communicating with the cylinder 138 at the exhaust end or half thereof; and the inlet piston 145 opens and closes inlet ports 147 communicating with the cylinder 138 at the inlet half or end thereof.

A wabble spider 148 is journaled on the oblique crank 126. Linking the spider 148 to the several exhaust pistons 144 are connecting rods 149, which are connected to the spider 148 by ball and socket joints 189 similar to the joints 47 of the first embodiment, and to the respective pistons by ball and socket joints as in the first embodiment. The centers of the corresponding ball and socket joints are the effective points of intersection between the rods 149 and the spider 148. These points 190 are situated in a plane which is normal to the axis of the crank 126.

As best seen in FIG. 20, each ball and socket joint 189 at the points 190 of intersection includes a concave recess 191 in radial arms 188 of the spider 148, the recess 191 being spherical and having a center point substantially common with the point 190 and intersecting a substantially flat bottom end surface 192 of an internally threaded transverse bore 193 of the arm 188. The axis of bore 193 is preferably angularly displaced in nonparallel relationship to the axis of the crank 126, at an elevation of approximately 8½ degrees therefrom, whereby the surface 192 which is normal to the axis of the bore 193 is in a plane intersecting the point 190 but angularly displaced from the plane normal to the axis of the crank 126.

By means of such construction, peripheral inner surface contact of the recess 191 with the ball end 194 of the rod 149 is constantly greater than 90°, affording direct transmission of radial thrust from the spider to the ball rather than to a concave-convex ball retaining member 195 secured within the threaded bore 193 as by an externally threaded sleeve 196. In this manner, little or no thrust load is placed on the retaining member 195 during the upward movement of the spider arm 188, that is the compression stroke of the pistons 144 and 145, when the greatest load is placed on the ball and socket joint 190.

The crank at the inlet end of the block 121 is similarly equipped with a wabble spider which is linked in a similar manner to the inlet piston 145. The two ends of the engine are essentially the same, and are therefore not shown in this embodiment.

The engine shown in FIG. 20 is similar to that shown in FIG. 1 inasmuch as the two pistons, 144, 145, approach each other within the cylinder 138, generally in phase, and then are pushed apart, also generally in phase, by the rapid burning and expansion of the fuel injected by a fuel injector referred to by the numeral 153 from a fuel line not shown. The exact phase relation between the pistons 144 and 145 is determined by the phase relation between the two cranks of the shaft 122 as previously described for the shaft 22. The cranks like 126 are formed at approximately ten degrees out of phase, i.e., the crank 126 at the exhaust end of the machine causing its corresponding pistons 144 to reach dead center before the pistons 145, and recede from the top dead center before the pistons 145 reach top dead center.

In this embodiment, a pre-combustion chamber 154 is preferably provided extending radially from the interior of the cylinder 138 and communicating with a fuel injector 153. The pre-combustion chamber 154 may be formed by the inner diameter of a thimble 155 having a circumferentially relieved portion 156 extending through the block 121 and having a threaded connection 157 with a boss 158 of the cylinder 138. A shoulder 159 of the thimble 155 is drawn into abutment with the block 121 to lock the thimble 155 in place, and secure the sleeve cylinder 138 in its relative position within the bore 141.

The pre-combustion chamber 154 serves to space the nozzle of the fuel injector 153 from the cylinder 138 and thereby increase the vaporization of the fuel before it reaches the main combustion chamber within the cylinder 138. The chamber 154 also serves to hold the fuel and therefore obtain a better torsion while the initial ignition occurs within this chamber.

The inner diameter of the pre-combustion chamber 154 is preferably large enough to span the distances between the moving pistons 144 and 145 during the entire injection period. Referring to FIGS. 23 through 25, and particularly to FIG. 23, the opening referred to by the numeral 161 of the pre-combustion chamber 154 is shown as located on the operating center of the cylinder 138. The pistons 144 and 145, being out of phase as previously described, are illustrated in this figure whereby the piston 144 is moving inwardly as indicated by the arrow, towards the center of the sleeve, approximately ten degrees operating movement ahead of the piston 145. At this position, the fuel injection is initiated by timing means not shown.

FIG. 24 shows the positions of the pistons 144 and 145 relative to the opening 161 at the peak of the fuel injection period, wherein the piston 144 has begun to move outwardly as indicated by the arrow thereon, and the piston 145 has reached its inward extremity, or top dead center of its connecting rod and spider.

In FIG. 25, the relative positions of the pistons 144 and 145 are illustrated as at the end of the fuel injection period, wherein the piston 144 has not yet fully uncovered the opening 161 of the chamber 154 and the piston 145 has moved in the direction of its arrow approximately five degrees from the operating center of the cylinder 138.

By providing the pre-combustion chamber, as described, a much more complete and efficient combustion occurs. The primary cracking of the fuel occurs within the chamber 154, and the fuel is drawn into the interior of the cylinder 138 as the pistons recede to discharge the chamber 154 of all the injected fuel. The subsequent exhaust and scavenging operations occur as previously described in the first embodiment. The exhaust ports 146 communicate with manifolds 171 and 172, as previously described for manifolds 71 and 72, wherein the 1st, 3rd and 5th cylinders exhaust into the manifold 171 and the 2nd, 4th and 6th cylinders exhaust into the manifold 172, the manifolds having suitable openings communicating with the exterior of the block 121.

As best seen in FIGS. 20 and 22, a beveled gear 173 is fixed to the block 121 as by bolts 174, or the like, extending through a flange 176 of the gear. The beveled gear 173 is enmeshed with a beveled gear 177 of the spider 148, the gears 173 and 177 being physically and functionally similar to the gears 57 and 57' of the first embodiment.

Referring to FIG. 22, means for lubricating the engine is illustrated, comprising a nozzle 178 extending from a conduit 179 which is in communication with a suitable oil pump (not shown). Lubricating oil is ejected from the nozzle 178 downwardly, to the shaft 122 and gears 173 and 174, from where it is splashed on the parts which require lubrication. It has been found that by this method, the lubricant is splashed on the connecting rods 149 and thence to the ball joints at each end thereof, and to the bearings 181 which journal the spider 148 to the crank 127. It is to be noted that the sleeves 138 extend outwardly over the beveled gear 173 to form a screen or guard to prevent lubricating oil from being splashed directly into the cylinder 138, whereby an excess of oil might enter the cylinder. This extension or overhang, as indicated at 182, prevents such excess lubrication at these points.

A cavity 183 is preferably formed in the block 121 and is provided with inlet and outlet ports, the outlet port being indicated at 184 in FIG. 20. The cavity 183 communicates with the annular spaces surrounding the cylinders 138 by means of passages 186 in the wall of the block. The coolant may therefore circulate from the inlet port (not shown) of the cooling jacket, through the cavity 183 extracting heat from the manifolds 171 and 172, and through the annular spaces between the flanges 139 of the cylinders 138 to cool the cylinders and then passing back through the cavity 183 and outwardly through the outlet passage 184.

While the instant invention has been shown and described herein in what is conceived to be the most practical and preferred embodiment, it is recognized that departures may be made therefrom within the scope of the invention which is therefore not to be limited to the details disclosed herein but is to be accorded the full scope of the claims.

What is claimed is:

1. A barrel type reciprocating machine comprising a block having an exhaust end and an inlet end, a shaft journaled in said block and including an oblique crank at each end thereof, said block including a plurality of cylinders parallel to said shaft and spaced therearound, a pair of wabble spiders journaled one on each of said cranks, a plurality of pistons two in each said cylinder and reciprocable in opposed relation, said pistons in the exhaust end of said block being exhaust pistons and each having a rod linked thereto and to the spider at said exhaust end of said block, said pistons in the inlet end of said block being inlet pistons and each having a rod linked thereto and to the spider at the inlet end of said block, the points of the intersection of the rods at the exhaust end of said block with the corresponding spider lying in a plane normal to the crank to which the spider is journaled, the points of the intersection of the rods at the inlet end of said block with that corresponding spider also lying in a plane normal to the crank to which said last mentioned spider is journaled, each of said planes being displaced along its respective crank from the point of intersection between the axis of said shaft and the axis of its respective crank, whereby as said shaft turns each of said rod points of intersection describes a loop, thus orienting each rod more closely to the vector of optimum force application on said crank during the high pressure portion of each piston stroke, exhaust port means at the exhaust end of said block communicating with each of said cylinders and effective to be opened and closed by said exhaust pistons, inlet port means at the inlet end of said block communicating with each of said cylinders and effective to be opened and closed by said inlet pistons, the crank at the exhaust ends of said blocks being advanced in phase with respect to the other crank, and said exhaust port means being located closer to the operating center of the cylinders than said inlet port means, whereby during the outward or expansion stroke of said pistons said exhaust port means is opened ahead of said inlet port means by a given crank angle, and during the inward or compression stroke of said pistons said exhaust port means is closed ahead of said inlet port means by a lesser crank angle.

2. A machine in accordance with claim 1, wherein said shaft is unbroken axially and having a pair of spider-to-crank-thrust bearings, one on each of said cranks to transmit the outward thrust of said pistons to said shaft, whereby said outward thrust is absorbed and counteracted by tensioning of said shaft.

3. A barrel-type reciprocating machine comprising a block having an exhaust end and an inlet end, a shaft journaled in said block and including an oblique crank at each end thereof, said block including a plurality of cylinders parallel to said shaft and spaced therearound, a pair of wabble spiders journaled one on each of said cranks, a plurality of pistons, two in each said cylinder and reciprocable in opposed relation, said pistons in the exhaust end of said block being exhaust pistons and each having a rod linked thereto and to the spider at said exhaust end of said block, said pistons in the inlet end of said block being inlet pistons and each having a rod linked thereto and to the spider at the inlet end of said block, the points of intersection of the rods at the exhaust end of said block with the corresponding spider lying in a plane normal to the crank to which said spider is journaled, the points of the intersection of the rods at the inlet end of said block with that corresponding spider also lying in a plane normal to the crank to which said last mentioned spider is journaled, each of said planes being displaced along its respective crank from the point of intersection between the axis of said shaft and the axis of its respective crank, whereby as said shaft turns each of said rod points of intersection describes a loop, thus orienting each rod more closely to the vector of optimum force application on said crank during the high pressure portion of each piston stroke, exhaust port means at the exhaust end of said block communicating with each of said cylinders and being effective to be opened and closed by said pistons, inlet port means in the inlet end of said block communicating with each of said cylinders and effective to be opened and closed by the inlet pistons, said exhaust port means being located closer to the operating center of the cylinders than said inlet port means, whereby during the outward or expansion stroke of said pistons said exhaust port means is opened ahead of said inlet port means by a given crank angle, and during the inward or compression stroke of said pistons said exhaust port means is closed ahead of said inlet port means by a lesser crank angle.

4. A barrel-type reciprocating machine comprising a block having an exhaust end and an inlet end, a shaft journaled in said block and including an oblique crank at each end thereof, said block including a plurality of cylinders parallel to said shaft and spaced therearound, a pair of wabble spiders journaled one on each of said cranks, a plurality of pistons, two in each said cylinder and reciprocable in opposed relation, said pistons in the exhaust end of said block being exhaust pistons and each having a rod linked thereto and to the spider at each exhaust end of said block, said pistons in the inlet end of said block being inlet pistons and each having a rod linked thereto and to the spider at the inlet end of said block, the points of intersection of the rods at the exhaust end of said block with the corresponding spider lying in a plane normal to the crank to which the spider is journaled, the points of the intersection of the rods at the inlet end of said block with that corresponding spider also lying in a plane normal to the crank to which said last mentioned spider is journaled, each of said planes being displaced along its respective crank from the point of intersection between the axis of said shaft and the axis of its respective crank, whereby as said shaft turns each of said rod points of intersection describes a loop, thus orienting each rod more closely to the vector of optimum force application on said crank during the high pressure portion of each piston stroke, exhaust port means at the exhaust end of said block communicating with each of said cylinders and being effective to be opened and closed by said pistons, inlet port means in the inlet end of said block communicating with each of said cylinders and effective to be opened and closed by the inlet pistons, said machine being characterized by the fact that the crank at the exhaust end of said block is advanced in phase with respect to the other crank by a predetermined angle of shaft rotation, and by the further fact that said exhaust port means is located closer to the operating center of the cylinders than are said inlet port means by a second predetermined angle of shaft rotation less than said first mentioned angle, whereby during the outward or expansion stroke of said pistons said exhaust port means is opened ahead of said inlet port means by a shaft rotation angle equal to the sum of said first and second mentioned angles, and during the inward or compression stroke of said pistons said exhaust port means is closed ahead of said inlet port means by a lesser shaft rotation angle equal to the difference between said first and second mentioned angles.

5. A barrel type reciprocating machine comprising a block having an exhaust end and an inlet end, a shaft journaled in said block and including an oblique crank at each end thereof, said block including a plurality of cylinders parallel to said shaft and spaced therearound, a pair of wabble spiders journaled one on each of said cranks, a plurality of pistons two in each said cylinder and reciprocable in opposed relation, said pistons in the exhaust end of said block being exhaust pistons and each having a rod linked thereto and to the spider at said exhaust end of said block, said pistons in the inlet end of said block being inlet pistons and each having a rod linked thereto and to the spider at the inlet end of said block, the points of the intersection of the rods at the exhaust end of said block with the corresponding spider lying in a plane normal to the crank to which the spider is journaled, the points of the intersection of the rods at the inlet end of said block with that corresponding spider also lying in a plane normal to the crank to which said last mentioned spider is journaled, each of said planes being displaced along its respective crank from the point of intersection between the axis of said shaft and the axis of its respective crank, whereby as said shaft turns each of said rod points of intersection describes a loop, thus orienting each rod more closely to the vector of optimum force application on said crank during the high pressure portion of each piston stroke, exhaust port means at the exhaust end of said block communicating with each of said cylinders and effective to be opened and closed by said exhaust pistons, inlet port means at the inlet end of said block communicating with each of said cylinders and effective to be opened and closed by said inlet pistons, the crank at the exhaust ends of said blocks being advanced in phase with respect to the other crank, whereby during the outward or expansion stroke of said pistons said exhaust port means is opened ahead of said inlet port means, and during the inward or compression stroke of said pistons said exhaust port means is closed ahead of said inlet port means.

6. In a barrel-type reciprocating machine comprising a block having an exhaust end and an inlet end, a shaft journaled in said block and including an oblique crank at each end thereof, a plurality of longitudinal cylinders in said block parallel to said shaft and spaced therearound, a pair of wabble spiders journaled one on each of said cranks, a plurality of pistons, two in each said cylinder and reciprocable in opposed relation, said pistons in the exhaust end of said block being exhaust pistons and each having a rod linked thereto and to the spider at said exhaust end of said block, said pistons in said inlet end of said block being inlet pistons and each having a rod linked thereto and to the spider at said inlet end of said block, the points of intersection of the rods at the exhaust end of said block with the corresponding spider lying in a plane normal to the crank to which the spider is journaled, the points of the intersection of the rods at the inlet end of said block with that corresponding spider also lying in a plane normal to the crank to which said last mentioned spider is journaled, each of said planes being displaced along its respective crank from the point of intersection between the axis of said shaft and the axis of its respective crank, whereby as said shaft turns each of said rod points of intersection describes a loop, thus orienting each rod more closely to the vector of optimum force application on said crank during the high pressure portion of each piston stroke, exhaust port means in the exhaust end of each of said cylinders effective to be opened and closed by its exhaust piston, inlet port means in the inlet end of each of said cylinders effective to be opened and closed by its inlet piston, the combination of fuel injector means adjacent each of said cylinders, means defining a pre-combustion chamber adjacent each of said cylinders and communicating between said fuel injection means and said cylinders, and means for initiating injection of fuel into said pre-combustion chamber in preselected order before the corresponding two opposing pistons reach their mimimal distance and wherein each of said pre-combustion chamber means includes an opening in communication with said cylinder which is appreciably greater than the maximal distance between two opposing pistons at the instant when the fuel injection has stopped.

7. A barrel-type reciprocating machine, comprising a block having an exhaust end and an inlet end, a shaft journaled in said block and including an oblique crank at each end thereof, a plurality of longitudinal cylinders in said block parallel to said shaft and spaced therearound, a pair of wabble spiders journaled one in each of said cranks, a plurality of pistons, two in each said cylinder and reciprocal in opposed relation, said pistons in the exhaust end of said block being exhaust pistons each having a rod linked thereto and to the spider at said exhaust end of said block, said pistons in said inlet end of said block being inlet pistons and each having a rod linked thereto and to the spider at said inlet end of said blocks, the points of intersection of the rods at the exhaust end of said block with the corresponding spider lying in a plane normal to the crank to which the spider is journaled, the points of the intersection of the rods at the inlet end of said block with that corresponding spider also lying in a plane normal to the crank to which said last mentioned spider is journaled, each of said planes being displaced along its respective crank from the point of intersection between the axis of said shaft and the axis of its respective crank, whereby as said shaft turns each of said rod points of intersection describes a loop, thus orienting each rod more closely to the vector of optimum force application on said crank during the high pressure portion of each piston stroke, exhaust port means in the exhaust end of each of said cylinders effective to be opened and closed by its exhaust piston, inlet port means in the inlet end of each of said cylinders effective to be opened and closed by the inlet pistons, the crank at the exhaust end of said block being advanced in phase with respect to the other crank, fuel injector means adjacent each of said cylinders, means defining a pre-combustion chamber adjacent each of said cylinders and communicating between said fuel injection means and said cylinders, said pre-combustion chamber including an opening in communication with said cylinder appreciably greater than the distance between two opposing pistons at the moments of initiation and termination of fuel injection.

8. A barrel-type reciprocating machine, comprising a block having an exhaust end and an inlet end, a shaft journaled in said block and including an oblique crank at each end thereof, a plurality of longitudinal cylinders in said block parallel to said shaft and spaced therearound, a pair of wabble spiders journaled one in each of said cranks, a plurality of pistons, two in each said cylinder and reciprocal in opposed relation, said pistons in the exhaust end of said block being exhaust pistons each having a rod linked thereto and to the spider at said exhaust end of said block, said pistons in said inlet end of said block being inlet pistons and each having a rod linked thereto and to the spider at said inlet end of said block, the points of intersection of the rods at the exhaust end of said block with the corresponding spider lying in a plane normal to the crank to which the spider is journaled, the points of the intersection of the rods at the inlet end of said block with that corresponding spider also lying in a plane normal to the crank to which said last mentioned spider is journaled, each of said planes being displaced along its respective crank from the point of intersection between the axis of said shaft and the axis of its respective crank, whereby as said shaft turns each of said rod points of intersection describes a loop, thus orienting each rod more closely to the vector of optimum force application on said crank during the high pressure portion of each piston stroke, exhaust port means in the exhaust end of each of said cylinders effective to be opened and closed by its exhaust piston, inlet port means in the inlet end of each of said cylinders effective to be opened and closed by the inlet pistons, fuel injector means adjacent each of said cylinders, means defining a pre-combustion chamber adjacent each of said cylinders and communicating between said fuel injection means and said cylinders, said pre-combustion chamber including an opening in communication with said cylinder appreciably greater than the distance between two opposing pistons at the moments of initiation and termination of fuel injection.

References Cited in the file of this patent

UNITED STATES PATENTS

| | | |
|---|---|---|
| 1,116,768 | Underwood | Nov. 10, 1914 |
| 1,656,884 | Davol | Jan. 17, 1928 |
| 1,699,111 | Lyons | June 15, 1929 |
| 2,054,232 | Schneider | Sept. 15, 1936 |
| 2,067,049 | Goldberg | Jan. 5, 1937 |
| 2,119,219 | Ruth | May 31, 1938 |
| 2,133,842 | Bailey | Oct. 18, 1938 |
| 2,229,246 | Istad | Jan. 21, 1941 |
| 2,332,105 | Neuland | Oct. 19, 1943 |
| 2,354,620 | Smith | July 25, 1944 |
| 2,406,292 | Hall | Aug. 20, 1946 |
| 2,469,651 | Jacobson | May 10, 1949 |
| 2,475,295 | Sherman | July 5, 1949 |
| 2,513,083 | Eckert | June 27, 1950 |

FOREIGN PATENTS

| | | |
|---|---|---|
| 448,421 | France | Nov. 26, 1912 |